United States Patent
Choi (10) Patent No.: US 10,919,566 B2
(45) Date of Patent: Feb. 16, 2021

(54) APPARATUS AND METHOD FOR CONTROLLING MOTOR FOR ELECTRIC POWER STEERING SYSTEM

(71) Applicant: MANDO CORPORATION, Gyeonggi-do (KR)

(72) Inventor: Dae Geun Choi, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 110 days.

(21) Appl. No.: 15/896,073

(22) Filed: Feb. 14, 2018

(65) Prior Publication Data
US 2018/0229762 A1    Aug. 16, 2018

(30) Foreign Application Priority Data
Feb. 15, 2017   (KR) .................. 10-2017-0020495

(51) Int. Cl.
*B62D 5/04*     (2006.01)
*H02K 21/16*    (2006.01)

(52) U.S. Cl.
CPC .......... *B62D 5/046* (2013.01); *B62D 5/0403* (2013.01); *H02K 21/16* (2013.01); *H02P 2201/09* (2013.01)

(58) Field of Classification Search
CPC ......... B62D 5/046; B62D 5/0463; B62D 5/04
See application file for complete search history.

(56) References Cited

U.S. PATENT DOCUMENTS

| 7,009,856 B2 * | 3/2006 | Moon ................. | B60L 15/025 363/37 |
| 7,468,565 B2 * | 12/2008 | Hoshiba ............... | B60L 3/003 307/10.1 |
| 7,579,792 B2 * | 8/2009 | Nagashima .......... | B60L 15/007 318/105 |

(Continued)

FOREIGN PATENT DOCUMENTS

| CN | 101258068 | 9/2008 |
| CN | 104025449 | 9/2014 |

(Continued)

OTHER PUBLICATIONS

Office Action dated Apr. 20, 2020 for Chinese Patent Application No. 201810153410.8 and its English machine translation by Google Translate.

*Primary Examiner* — Kevin Hurley
*Assistant Examiner* — Michael R Stabley
(74) *Attorney, Agent, or Firm* — Ladas & Parry, LLP (57) ABSTRACT

An apparatus for controlling a motor for an electric power steering system according to an embodiment of the present invention, the motor including a stator on which a plurality of coils are wound and a rotor, which is placed inside the stator and into which a plurality of magnets are inserted, the plurality of coils being divided into two coil groups, the apparatus includes: a first controller configured to control supply of power applied to a first coil group that is one of the two coil groups; a second controller configured to control supply of power applied to a second coil group that is the other one of the two coil groups; and a boost converter configured to compensate for a difference between power output from the first controller and power output from the second controller.

17 Claims, 4 Drawing Sheets

(56) References Cited

U.S. PATENT DOCUMENTS

| | | | | |
|---|---|---|---|---|
| 7,755,306 B2* | 7/2010 | Oyobe | ............... | H02M 7/487 318/112 |
| 8,013,553 B2* | 9/2011 | Taniguchi | ............... | H02P 25/22 318/400.27 |
| 8,054,025 B2* | 11/2011 | Oyobe | ............... | B60K 6/365 180/65.21 |
| 8,169,174 B2* | 5/2012 | Shibata | ............... | B62D 5/0484 180/402 |
| 8,670,904 B2* | 3/2014 | Yoneda | ............... | B62D 5/046 180/404 |
| 9,174,627 B2* | 11/2015 | Atsumi | ............... | B60L 50/16 |
| 9,490,742 B2* | 11/2016 | Hatanaka | ............... | H02P 6/28 |
| 9,985,570 B2* | 5/2018 | Endoh | ............... | H02P 29/64 |
| 2015/0318793 A1* | 11/2015 | Kobayashi | ............... | H02M 3/156 363/97 |
| 2015/0340975 A1* | 11/2015 | Yanagi | ............... | B60K 6/52 318/400.06 |
| 2016/0089981 A1* | 3/2016 | Kodawara | ............... | B60L 1/003 307/10.1 |
| 2016/0126877 A1* | 5/2016 | Endoh | ............... | H02P 29/64 318/400.02 |
| 2016/0261222 A1* | 9/2016 | Hatanaka | ............... | H02P 6/28 |

FOREIGN PATENT DOCUMENTS

| | | |
|---|---|---|
| CN | 105680762 | 6/2016 |
| CN | 105850030 | 8/2016 |
| CN | 105915125 | 8/2016 |
| DE | 10 2013 208354 | 11/2013 |
| KR | 10-2005-0003732 | 1/2005 |
| WO | 2015/166528 | 9/2008 |

* cited by examiner

APPARATUS AND METHOD FOR CONTROLLING MOTOR FOR ELECTRIC POWER STEERING SYSTEM

CROSS-REFERENCE TO RELATED APPLICATION

This application claims priority to and the benefit of Korean Patent Application No. 10-2017-0020495, filed on Feb. 15, 2017, the disclosure of which is incorporated herein by reference in its entirety.

BACKGROUND

1. Field of the Invention

The present invention relates to an apparatus and method for controlling a motor, and more particularly, to an apparatus and method for controlling a three-phase motor used in an electric power steering system.

2. Discussion of Related Art

Applications of electric power steering systems to small cars and large cars are recently increasing. Electric power steering systems according to the related art are widely used in several fields, such as an automatic parking system, a lane keeping system, and the like.

In such electric power steering systems, steering of a car is performed by a motor. When an inverter for applying power to the motor or an electric control unit (ECU) for controlling the inverter malfunctions, a problem occurs in a steering operation, which gives rise to serious trouble in a driver's safety.

Various ways to solve such a problem have been developed and used. Among them, a redundancy controller having two microcontrollers and two inverters has been developed. In detail, the redundancy controller employs two inverters for applying power to one motor and two control units for controlling the inverters.

However, when, in an electric power steering system for controlling a motor using two inverters, there is a difference between input/output voltages of the two inverters, motor control is unbalanced so that noise or ripple occurs in the electric power steering system. Thus, the performance of the electric power steering system is deteriorated.

The following prior-art document discloses a vector control type dual inverter system for an induction motor, including a first inverter connected to one side of a winding of a stator for the induction motor and a second inverter connected to the other side of the winding of the stator, wherein the first inverter compensates for a counter-electromotive force of the induction motor and the second inverter compensates for invalid power of the induction motor so that a constant output section of the induction motor can be enlarged during weak field control of the induction motor caused by voltage limitation, and the prior-art document does not include a technical key point of the present invention.

[Document of Related Art]
[Patent Document]
  Korean Laid-Open Patent Application No. 2005-0003732

SUMMARY OF THE INVENTION

The present invention is directed to an apparatus and method for controlling a motor for an electric power steering system, whereby, in a dual inverter system for supplying power to a motor using two inverters, powers at two inverters are balanced so that malfunction of the electric power steering system can be prevented.

The problem to be solved is not limited to the above-described problem, and other unmentioned problems will be clearly understood by those skilled in the art from the following description.

According to an aspect of the present invention, there is provided an apparatus for controlling a motor for an electric power steering system, the motor including a stator on which a plurality of coils are wound and a rotor, which is placed inside the stator and into which a plurality of magnets are inserted, the plurality of coils being divided into two coil groups including three or three times the number of coils to which three-phase powers each having an U-phase, a V-phase and a W-phase are respectively applied, the apparatus including: a first controller configured to control supply of power applied to a first coil group that is one of the two coil groups; a second controller configured to control supply of power applied to a second coil group that is the other one of the two coil groups; and a boost converter configured to compensate for a difference between power output from the first controller and power output from the second controller.

The first controller may include a first inverter configured to apply three-phase power to the first coil group by converting direct current (DC) power supplied from a battery, and the second controller may include a second inverter configured to apply the three-phase power to the second coil group by converting the DC power supplied from the battery, and the boost converter may compensate for a difference between the first voltage and the second voltage based on a difference between a first voltage and a second voltage input to the first inverter and the second inverter, respectively.

The apparatus may further include a first voltage sensor and a second voltage sensor configured to detect the first voltage and the second voltage, respectively.

The boost converter may include: an inductor having one side connected to a positive terminal of the battery; a first switch having one side connected to the other side of the inductor and the other side connected to a ground; a second switch having one side connected to a first node formed between the inductor and the first switch and the other side connected to the first inverter; and a third switch having one side connected to the first node and the other side connected to the second inverter.

The boost converter may include: a first capacitor having one side connected between the second switch and the first inverter and the other side connected to the ground; and a second capacitor having one side connected between the third switch and the second inverter and the other side connected to the ground.

At least one of the first controller and the second controller may further include a microcontroller configured to control at least one of the first switch, the second switch, and the third switch.

When a difference between the first voltage and the second voltage is equal to or greater than a predetermined value, the microcontroller may control at least one of the first switch, the second switch, and the third switch.

When the first voltage is greater than the second voltage, the microcontroller may turn on the first switch and the third switch.

When the second voltage is greater than the first voltage, the microcontroller may turn on the first switch and the second switch.

According to another aspect of the present invention, there is provided a method for controlling a motor for an electric power steering system using an apparatus for controlling a motor for an electric power steering system, the motor including a stator on which a plurality of coils are wound and a rotor, which is placed inside the stator and into which a plurality of magnets are inserted, the plurality of coils being divided into two coil groups including three or three times the number of coils to which three-phase powers each having an U-phase, a V-phase and a W-phase are respectively applied, wherein the apparatus includes a first inverter configured to apply power to a first coil group that is one of the two coil groups and a second inverter configured to apply power to a second coil group that is the other one of the two coil groups, the method including: detecting a first voltage and a second voltage input to the first inverter and the second inverter, respectively, from a battery; comparing the first voltage with the second voltage; compensating for a difference between the first voltage and the second voltage based on a comparison result of the first voltage and the second voltage using a boost converter; and comparing the first voltage with the second voltage, the difference therebetween having been compensated.

The comparing of the first voltage with the second voltage may include: comparing whether the difference between the first voltage and the second voltage is equal to or greater than a predetermined value; and comparing a magnitude of the first voltage with a magnitude of the second voltage.

The compensating for the difference between the first voltage and the second voltage may include, when the difference between the first voltage and the second voltage is equal to or greater than a predetermined value and the first voltage is greater than the second voltage, compensating for the difference between the first voltage and the second voltage by turning on a first switch and a third switch of the boost converter.

The compensating for the difference between the first voltage and the second voltage may include, when the difference between the first voltage and the second voltage is equal to or greater than a predetermined value and the second voltage is greater than the first voltage, compensating for the difference between the first voltage and the second voltage by turning on a first switch and a second switch of the boost converter.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. The same reference numerals are used for the same or similar elements regardless of the drawing number, and a redundant description thereof is omitted.

In the description of the present invention, if it is determined that a detailed description of commonly-used technologies or structures related to the invention may obscure the subject matter of the invention, the detailed description is omitted. Further, the attached drawings are provided to easily understand the spirit of the invention, and it should not be interpreted that the spirit of the invention is limited by the attached drawings.

Figure 1:
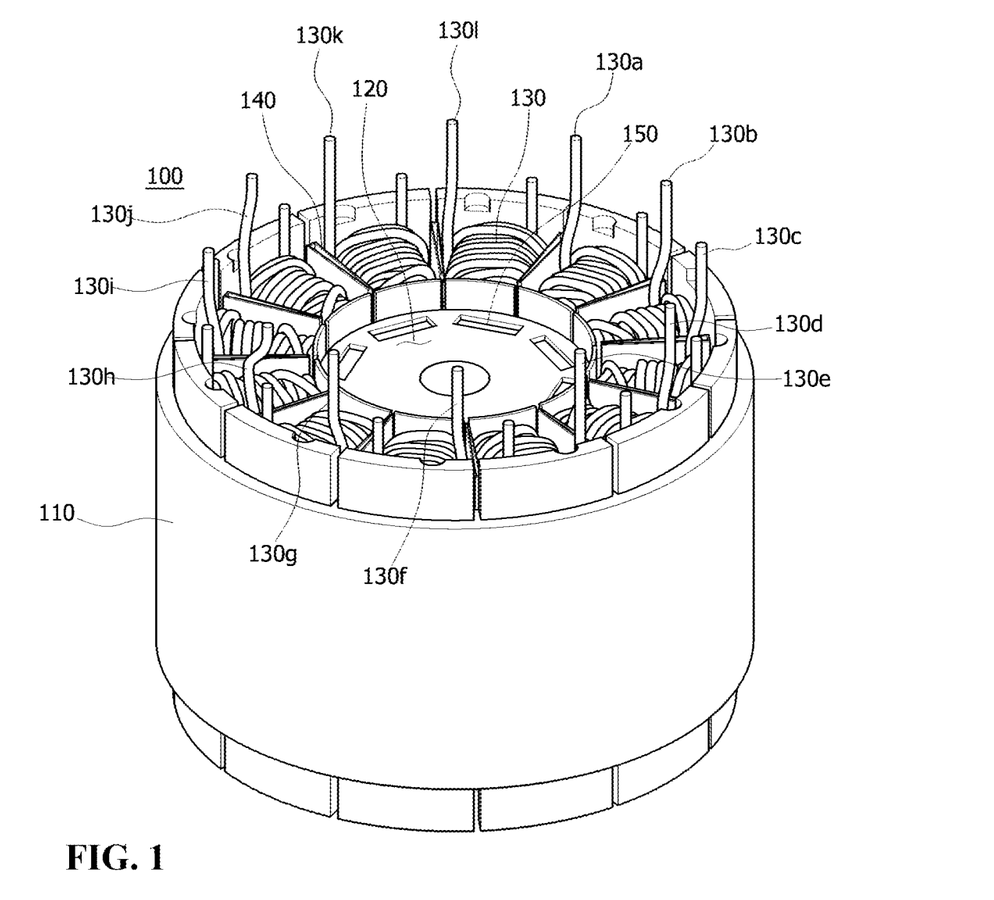
FIG. 1 is a view of a motor for an electric power steering system according to an example embodiment of the present invention.

Hereinafter, a motor for an electric power steering system according to an example embodiment of the present invention will be described with reference to FIG. 1. FIG. 1 is a view of a motor for an electric power steering system according to an example embodiment of the present invention.

A motor 100 for an electric power steering system according to an example embodiment of the present invention is a three-phase motor, and a permanent magnet synchronous motor (PMSM) may be generally used as the motor 100 for the electric power steering system. The three-phase motor 100 controlled by an apparatus for controlling a motor for an electric power steering system according to an example embodiment of the present invention will be firstly described. FIG. 1 is a view of a three-phase motor according to the present invention. The three-phase motor 100 according to the present invention as a PMSM largely includes a stator 110 and a rotor 120, as illustrated in FIG. 1.

Hollowness is formed in the stator 110, and a plurality of winding portions on which a coil 130 can be wound, are formed from an outer circumferential surface of the stator 110 in a direction toward the hollowness. The coil 130 is wound on the plurality of winding portions. In detail, three different powers are applied to the coil 130. The three different powers are a U-phase power, a V-phase power, and a W-phase power each having a phase difference of 120 degrees. Thus, three times the number of coils need to be wound.

Preferably, an insulator 140 is placed between the plurality of winding portions or the plurality of coils 130 in order to prevent short between the adjacent coils 130.

The rotor 120 is inserted into the hollowness and is spaced a predetermined distance apart from the winding portions.

A magnetic substance 150 is inserted into at least one groove formed in the rotor 120.

When the motor 100 for the electric power steering system according to an example embodiment of the present invention includes 12 coils 130a to 130l, as illustrated in FIG. 1, three coils may be set as one coil group, and 12 coils may be divided into totally 4 coil groups. Alternatively, six coils may be set as one coil group, and 12 coils may also be divided into totally 2 coil groups. For example, referring to FIGS. 1 and 2, 130a, 130b, 130c, 130g, 130h, and 130i may be set as a first coil group 131, and 130d, 130e, 130f, 130j, 1306k, and 130l may be set as a second coil group 132. In this case, a coil to which a U-phase power is applied, includes 130a, 130d, 130g, and 130j, and a coil to which a V-phase power is applied, includes 130*b*, 130*e*, 130*h*, and 130*k*, and a coil to which a W-phase power is applied, includes 130*c*, 130*f*, 130*i*, and 130*l*.

Figure 2:
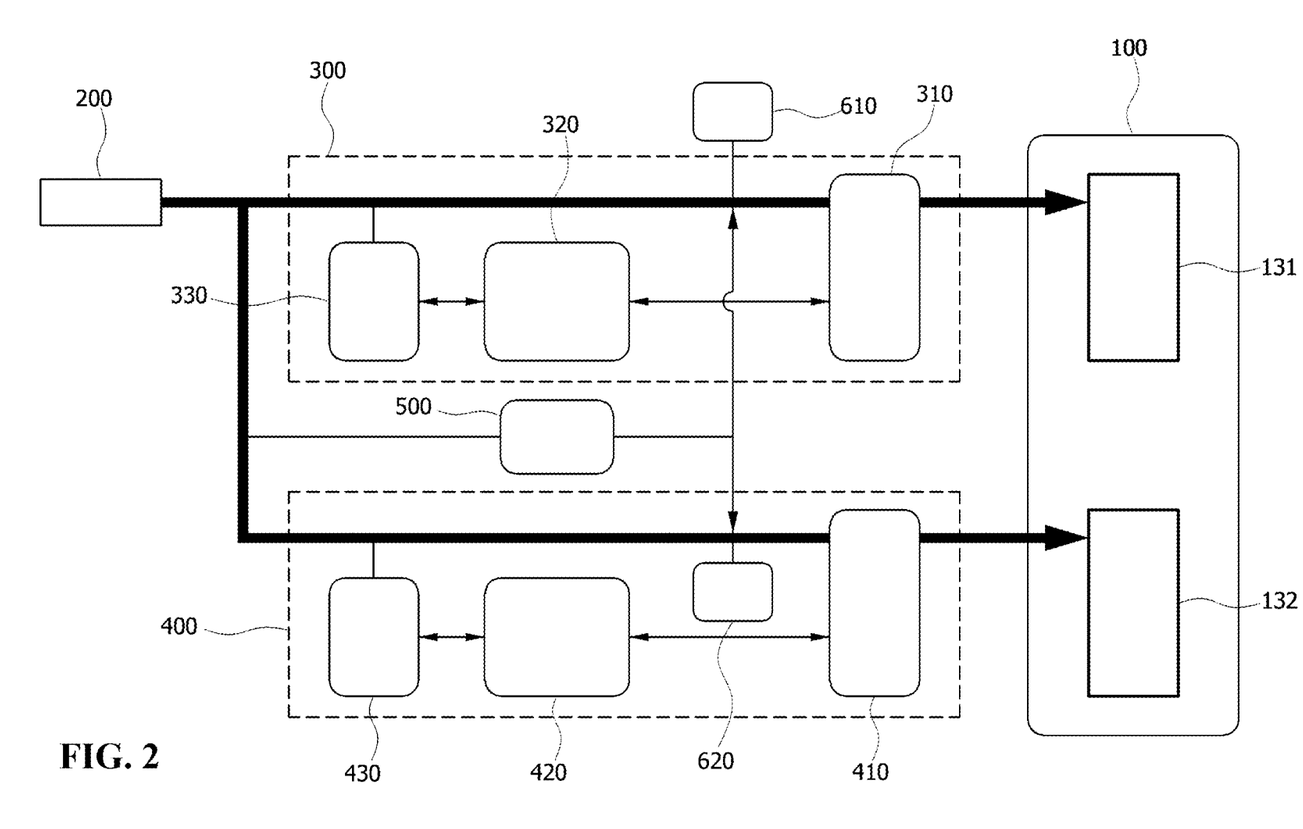
FIG. 2 is a block diagram schematically illustrating an electric power steering system according to an example embodiment of the present invention.
Figure 3:
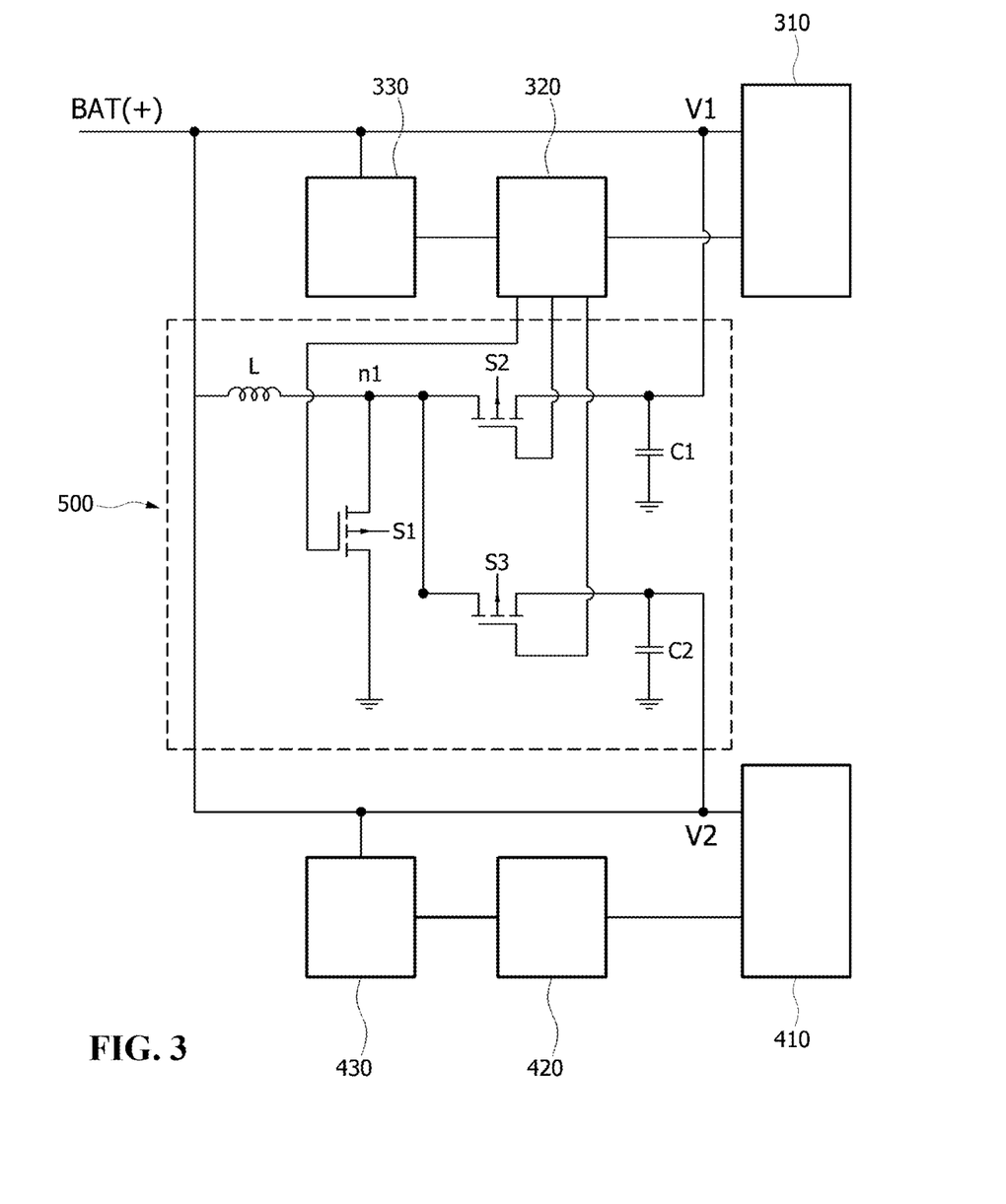
FIG. 3 is a circuit diagram of a boost converter in the electric power steering system according to an example embodiment of the present invention.

Hereinafter, an apparatus for controlling a motor for an electric power steering system according to an example embodiment of the present invention will be described with reference to FIGS. 2 and 3. FIG. 2 is a block diagram schematically illustrating an electric power steering system according to an example embodiment of the present invention, and FIG. 3 is a circuit diagram of a boost converter in the electric power steering system according to an example embodiment of the present invention.

The apparatus for controlling the motor for the electric power steering system according to an example embodiment of the present invention as an apparatus for controlling the motor 100 for the electric power steering system described above largely includes a first controller 300, a second controller 400, and a boost converter 500.

The first controller 300 and the second controller 400 perform a function of controlling the supply of power applied to the first coil group 131 and the second coil group 132, respectively. In detail, the first controller 300 includes a first inverter 310 that converts direct current (DC) power supplied from a battery 200 to apply three-phase power to the first coil group 131, and the second controller 400 includes a second inverter 410 that converts the DC power supplied from the battery 200 to apply the three-phase power to the second coil group 132.

A microcontroller for controlling the first inverter 310 and the second inverter 410 may be provided. The first inverter 310 and the second inverter 410 may be controlled by one microcontroller, and two microcontrollers that control the first inverter 310 and the second inverter 410, respectively, i.e., a first microcontroller 320 and a second microcontroller 420 may be provided, as illustrated in FIG. 2. In this case, the first microcontroller 320 may be included in the first controller 300, and the second microcontroller 420 may be included in the second controller 400.

Also, preferably, the first controller 300 and the second controller 400 includes a first regulator 330 and a second regulator 430, respectively, which convert the DC power into a rated power of the first inverter 310 and the second inverter 410 or a rated power of the first microcontroller 320 and the second microcontroller 420. The boost converter 500 is an element for performing a function of compensating for a difference between power output from the first controller 300 and power output from the second controller 400. In detail, the boost converter 500 performs a function of compensating for a difference between a first voltage V1 and a second voltage V2 based on the difference between the first voltage V1 and the second voltage V2 input to the first inverter 310 and the second inverter 410, respectively. Thus, preferably, the apparatus for controlling the motor for the electric power steering system according to an example embodiment of the present invention further includes a first voltage sensor 610 and a second voltage sensor 620, which detect the first voltage V1 and the second voltage V2, respectively, as illustrated in FIG. 2. Hereinafter, the boost converter 500 that constitutes the apparatus for controlling the motor for the electric power steering system according to an example embodiment of the present invention will be described in more detail with reference to FIG. 2.

The boost converter 500 in the apparatus for controlling the motor for the electric power steering system according to an example embodiment of the present invention includes an inductor L, a first switch S1, a second switch S2, and a third switch S3, as illustrated in FIG. 3.

The inductor L that is an element having one side connected to a positive terminal of the battery 200 performs a function of charging energy based on a current supplied from the battery 200 and discharging charged energy based on control of the first switch S1 that will be described later. The first switch S1 has one side connected to the other side of the inductor L and the other side connected to a negative terminal of the battery 200, i.e., a ground GND. The second switch S2 has one side connected to a first node n1 formed between the inductor L and the first switch S1 and the other side connected to the first inverter 310. The third switch S3 has one side connected to the first node n1 and the other side connected to the second inverter 410.

Also, the boost converter 500 of the apparatus for controlling the motor for the electric power steering system according to an example embodiment of the present invention may include a first capacitor C1 having one side connected between the second switch S2 and the first inverter 310 and the other side connected to the ground GND, and a second capacitor C2 having one side connected between the third switch S3 and the second inverter 410 and the other side connected to the ground GND. The first capacitor C1 and the second capacitor C2 perform a function of reducing noise of a boost power applied to one of the first inverter 310 and the second inverter 410 due to an operation of the boost converter 500.

Meanwhile, the first switch S1, the second switch S2, and the third switch S3 are controlled by the above-described microcontroller. Hereinafter, this will be described in detail. When the difference between the first voltage V1 and the second voltage V2 detected by the first voltage sensor 610 and the second voltage sensor 620, respectively, is equal to or greater than a predetermined value a, if it is determined that there is trouble in power balance between an input terminal of the first inverter 310 and an input terminal of the second inverter 410, the microcontroller controls at least one of the first switch S1, the second switch S2, and the third switch S3.

In detail, when the first voltage V1 is greater than the second voltage V2, the microcontroller may control the third switch S3 and the first switch S1 to turn on the third switch S3 and to turn on the first switch S1 or to perform continuous on/off switching so as to increase the second voltage V2. Conversely, when the second voltage V2 is greater than the first voltage V1, the microcontroller may control the second switch S2 and the first switch S1 to turn on the second switch S2 and to turn on the first switch S1 or to perform continuous on/off switching so as to increase the first voltage V1.

Figure 4:
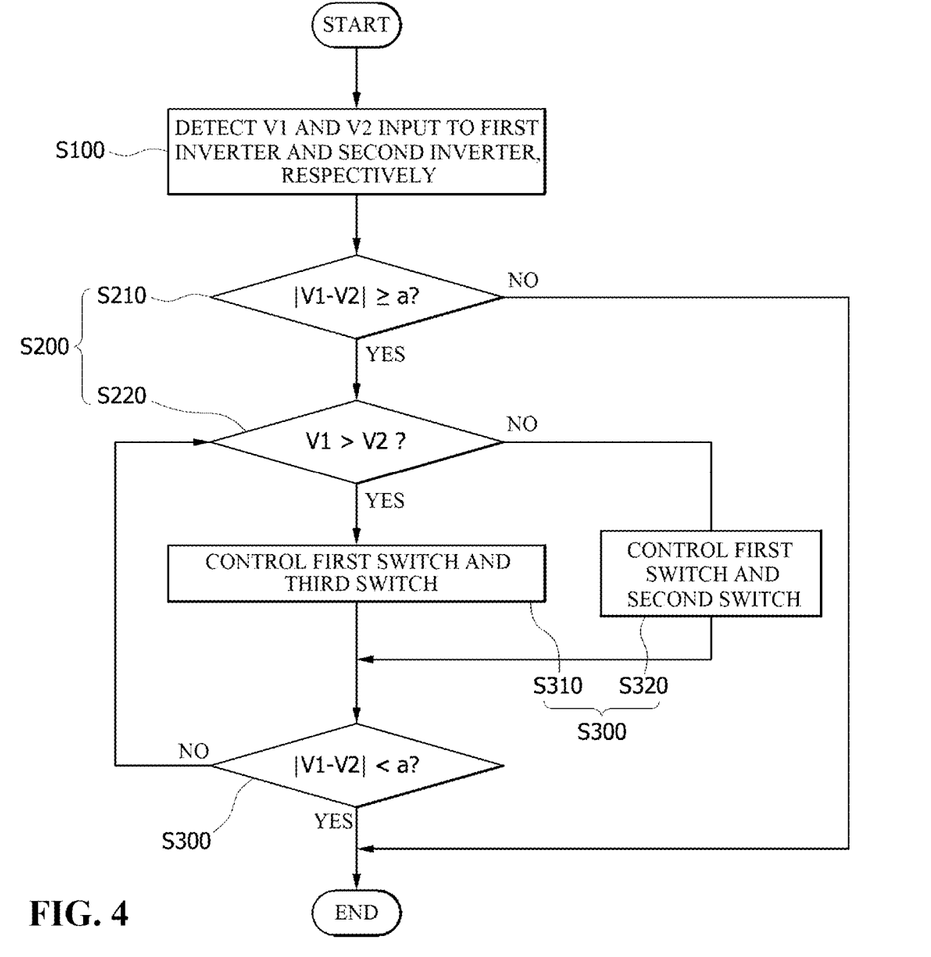
FIG. 4 is a flowchart illustrating a method for controlling a motor for an electric power steering system, according to an example embodiment of the present invention.

Hereinafter, a method for controlling a motor for an electric power steering system according to an example embodiment of the present invention will be described with reference to FIG. 4. A redundant description with the previously-described description in the apparatus for controlling the motor for the electric power steering system according to an example embodiment of the present invention is omitted. FIG. 4 is a flowchart time sequentially illustrating the method of controlling a motor for an electric power steering system according to an example embodiment of the present invention.

The method for controlling a motor for an electric power steering system according to an example embodiment of the present invention is directed to a method for controlling the motor for the electric power steering system according to an example embodiment of the present invention described above. In detail, operation S100 of detecting a first voltage V1 and a second voltage V2 input to the first inverter 310 and the second inverter 410, respectively, from the battery 200 is firstly performed, as illustrated in FIG. 4.

Subsequently, operation S200 of comparing the detected first voltage V1 with the detected second voltage V2 is performed using a microcontroller. Operation S200 of comparing the first voltage V1 with the second voltage V2 may be subdivided into operation S210 of comparing whether a difference between the first voltage V1 and the second voltage V2 is equal to or greater than a predetermined value a, and operation S220 of comparing a magnitude of the first voltage V1 with a magnitude of the second voltage V2.

After performing operation S200 of comparing the first voltage V1 with the second voltage V2, operation S300 of compensating for the difference between the first voltage V1 and the second voltage V2 is performed based on the result of comparing the first voltage V1 with the second voltage V2 using the boost converter 500. In detail, when the difference between the first voltage V1 and the second voltage V2 is equal to or greater than the predetermined value a and the first voltage V1 is greater than the second voltage V2, operation S310 of controlling the first switch S1 and the third switch S3 is performed using the microcontroller, thereby compensating for the difference between the first voltage V1 and the second voltage V2. Conversely, when the second voltage V2 is greater than the first voltage V1, operation S320 of controlling the first switch S1 and the second switch S2 using the microcontroller is performed such that the difference between the first voltage V1 and the second voltage V2 is compensated for.

If operation S300 of compensating for the difference between the first voltage V1 and the second voltage V2 is completed using the boost converter 500, operation S400 of comparing the first voltage V1 with the second voltage V2 again after compensation is performed using the microcontroller. Here, when the difference between the first voltage V1 and the second voltage V2 is less than the predetermined value a, it is determined that compensation has been properly performed, and control is terminated, and when the difference between both voltages is equal to or greater than the predetermined value a, operation S220 of comparing the magnitude of the first voltage V1 with the magnitude of the second voltage V2 is performed again.

In the apparatus and method for controlling the motor for the electric power steering system according to an example embodiment of the present invention, the boost converter 500 that compensates for a difference between input voltages between two inverters 310 and 410 is provided so that a voltage difference between the two inverters 310 and 410 can be reduced and thus the occurrence of noise or ripple can be minimized. Furthermore, only one inductor L is placed at the boost converter 500 so that the size of the control apparatus can be reduced and cost reduction can be expected.

As described above, in an apparatus and method for controlling a motor for an electric power steering system according to an example embodiment of the present invention, the apparatus for controlling a three-phase motor includes a plurality of inverters that apply power to each of a plurality of coil groups including three coils to which three-phase powers each having an U-phase, a V-phase and a W-phase are respectively applied, and a boost converter that compensates for a difference between input or output voltages of two inverters, so that the difference between the input or output voltages of the two inverters can be compensated for.

Thus, balance of motor control is maintained so that the occurrence of noise or ripple can be suppressed. Consequently, the performance of the electric power steering system can be prevented from being lowered.

The embodiments and the attached drawings described in the present specification are just illustration of a portion of the technical spirit of the present invention. Thus, the embodiments disclosed in the present specification are provided not to limit the technical spirit of the present invention but to describe the technical spirit of the present invention. Thus, it is obvious that the scope of the technical spirit of the present invention is not limited by these embodiments. It should be interpreted that modified examples and specific embodiments that may be easily inferred by those skilled in the art within the scope of the technical spirit included in the specification and the drawings of the present invention are included in the scope of a right of the present invention.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for controlling a motor for an electric power steering system, the motor comprising a stator on which a plurality of coils are wound and a rotor, which is placed inside the stator and into which a plurality of magnets are inserted, the plurality of coils being divided into two coil groups, the apparatus comprising:
    a first controller configured to control supply of power applied to a first coil group that is one of the two coil groups;
    a second controller configured to control supply of power applied to a second coil group that is the other one of the two coil groups; and
    a boost converter configured to compensate for a difference between power output from the first controller and power output from the second controller by compensating a difference between a first voltage input to the first controller and a second voltage input to the second controller by increasing or decreasing one of the first and second voltages.

2. The apparatus of claim 1, wherein the first controller comprises a first inverter configured to apply power to the first coil group by converting direct current (DC) power supplied from a battery,
    the second controller comprises a second inverter configured to apply the power to the second coil group by converting the DC power supplied from the battery, and
    the boost converter compensates for a difference between the first voltage and the second voltage.

3. The apparatus of claim 2, wherein the boost converter comprises:
    an inductor having one side connected to a positive terminal of the battery;
    a first switch having one side connected to the other side of the inductor and the other side connected to a ground;
    a second switch having one side connected to a first node formed between the inductor and the first switch and the other side connected to the first inverter; and
    a third switch having one side connected to the first node and the other side connected to the second inverter.

4. The apparatus of claim 3, wherein the boost converter comprises:

a first capacitor having one side connected between the second switch and the first inverter and the other side connected to the ground; and a second capacitor having one side connected between the third switch and the second inverter and the other side connected to the ground.

5. The apparatus of claim 3, wherein at least one of the first controller and the second controller further comprises a microcontroller configured to control at least one of the first switch, the second switch, and the third switch.

6. The apparatus of claim 5, wherein, when a difference between the first voltage and the second voltage is equal to or greater than a predetermined value, the microcontroller controls at least one of the first switch, the second switch, and the third switch.

7. The apparatus of claim 6, wherein, when the first voltage is greater than the second voltage, the microcontroller turns on the first switch and the third switch.

8. The apparatus of claim 6, wherein, when the second voltage is greater than the first voltage, the microcontroller turns on the first switch and the second switch.

9. The apparatus of claim 1, wherein the boost converter is configured to compensate the difference between the first voltage and the second voltage by increasing or decreasing one of the first and second voltages when the difference between the first voltage and the second voltage is equal to or greater than a predetermined value.

10. The apparatus of claim 1, further comprising:
a first voltage sensor configured to sense the first voltage; and
a second voltage sensor configured to sense the second voltage,
wherein the boost converter is configured to compensate the difference between the first voltage and the second voltage.

11. An apparatus for controlling a motor for an electric power steering system, the motor comprising a stator on which a plurality of coils are wound and a rotor, which is placed inside the stator and into which a plurality of magnets are inserted, the plurality of coils being divided into two coil groups, the apparatus comprising:
a first controller configured to control supply of power applied to a first coil group that is one of the two coil groups;
a second controller configured to control supply of power applied to a second coil group that is the other one of the two coil groups; and
a boost converter configured to compensate for a difference between power output from the first controller and power output from the second controller,
wherein:
the first controller comprises a first inverter configured to apply power to the first coil group by converting direct current (DC) power supplied from a battery,
the second controller comprises a second inverter configured to apply the power to the second coil group by converting the DC power supplied from the battery,
the boost converter compensates for a difference between a first voltage and a second voltage input to the first inverter and the second inverter, respectively, and the apparatus, further comprises a first voltage sensor and a second voltage sensor configured to detect the first voltage and the second voltage, respectively.

12. A method for controlling a motor for an electric power steering system using an apparatus for controlling a motor for an electric power steering system, the motor comprising a stator on which a plurality of coils are wound and a rotor, which is placed inside the stator and into which a plurality of magnets are inserted, the plurality of coils being divided into two coil groups, wherein the apparatus comprises a first inverter configured to apply power to a first coil group that is one of the two coil groups and a second inverter configured to apply power to a second coil group that is the other one of the two coil groups, the method comprising:
detecting a first voltage and a second voltage input to the first inverter and the second inverter, respectively, from a battery;
comparing the first voltage with the second voltage; and
compensating for a difference between the first voltage and the second voltage based on a comparison result of the first voltage and the second voltage using a boost converter,
wherein the compensating for the difference between the first voltage and the second voltage comprises compensating the difference between the first voltage and the second voltage by increasing or decreasing one of the first and second voltages.

13. The method of claim 12, wherein the comparing of the first voltage with the second voltage comprises:
comparing whether the difference between the first voltage and the second voltage is equal to or greater than a predetermined value; and
comparing a magnitude of the first voltage with a magnitude of the second voltage.

14. The method of claim 13, wherein the compensating for the difference between the first voltage and the second voltage comprises compensating the difference between the first voltage and the second voltage by increasing or decreasing one of the first and second voltages when the difference between the first voltage and the second voltage is equal to or greater than a predetermined value.

15. The method of claim 13, further comprising:
sensing, by a first voltage sensor, the first voltage; and
sensing, by a second voltage sensor, the second voltage.

16. The method of claim 12, wherein the compensating for the difference between the first voltage and the second voltage comprises, when the difference between the first voltage and the second voltage is equal to or greater than a predetermined value and the first voltage is greater than the second voltage, compensating for the difference between the first voltage and the second voltage by increasing the second voltage using the boost converter.

17. The method of claim 12, wherein the compensating for the difference between the first voltage and the second voltage comprises, when the difference between the first voltage and the second voltage is equal to or greater than a predetermined value and the second voltage is greater than the first voltage, compensating for the difference between the first voltage and the second voltage by increasing the first voltage using the boost converter.

* * * * *